(12) United States Patent
Kiechle et al.

(10) Patent No.: US 8,439,456 B2
(45) Date of Patent: May 14, 2013

(54) BUILT-IN DOMESTIC APPLIANCE, IN PARTICULAR A DISHWASHER

(75) Inventors: Franz Kiechle, Günzburg (DE); Karlheinz Rehm, Dischingen Ortst. Trugenhofen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 65 days.

(21) Appl. No.: 13/021,006

(22) Filed: Feb. 4, 2011

(65) Prior Publication Data
US 2012/0194047 A1   Aug. 2, 2012

(30) Foreign Application Priority Data

Jan. 31, 2011 (DE) .......................... 10 2011 003 412
Feb. 2, 2011 (DE) .......................... 10 2011 003 541

(51) Int. Cl.
*F16B 12/00* (2006.01)
*F16B 43/00* (2006.01)
*A47B 77/06* (2006.01)

(52) U.S. Cl.
USPC ............................ 312/111; 312/228; 411/546

(58) Field of Classification Search .................. 312/228, 312/111, 265.5, 257.1, 107, 108; 411/546; 403/167, 168
See application file for complete search history.

(56) References Cited

U.S. PATENT DOCUMENTS

| | | | | |
|---|---|---|---|---|
| 4,359,250 A * | 11/1982 | Jenkins | ......................... | 312/228 |
| 4,453,346 A * | 6/1984 | Powell et al. | ................... | 49/404 |
| 4,693,526 A * | 9/1987 | Spiegel | .................... | 312/351.13 |
| 4,940,298 A * | 7/1990 | Jackson et al. | ................ | 312/228 |
| 5,207,445 A * | 5/1993 | Hoelzl | ......................... | 280/607 |
| 5,288,191 A * | 2/1994 | Ruckert et al. | ................ | 411/432 |
| 5,340,258 A * | 8/1994 | Simon | ......................... | 411/535 |
| 5,492,388 A * | 2/1996 | Kawasaki | ................ | 296/193.02 |
| 5,758,676 A * | 6/1998 | Duckwall et al. | ............ | 134/201 |
| 5,895,189 A * | 4/1999 | Ruckert | ........................ | 411/535 |
| 5,906,450 A * | 5/1999 | Ng | .................................. | 403/46 |
| 6,238,123 B1 * | 5/2001 | Schwarzbich | ................. | 403/45 |
| 6,357,953 B1 * | 3/2002 | Ballantyne | ..................... | 403/43 |
| 2002/0018693 A1 * | 2/2002 | Schwarzbich | ............. | 403/374.4 |
| 2002/0076269 A1 * | 6/2002 | Schwarzbich | ............... | 403/167 |
| 2002/0150445 A1 * | 10/2002 | Ozawa et al. | ................. | 411/546 |
| 2002/0176739 A1 * | 11/2002 | Goto et al. | .................... | 403/301 |
| 2003/0077118 A1 * | 4/2003 | Kobusch et al. | .......... | 403/408.1 |
| 2003/0077142 A1 * | 4/2003 | Stone et al. | ................... | 411/107 |
| 2003/0230955 A1 * | 12/2003 | Welch | .......................... | 312/228 |

(Continued)

FOREIGN PATENT DOCUMENTS

DE       7534416 U       8/1976

*Primary Examiner* — David Dunn
*Assistant Examiner* — Ryan A Doyle
(74) *Attorney, Agent, or Firm* — James E. Howard; Andre Pallapies

(57) ABSTRACT

A built-in domestic appliance is provided that has a length-adjustable spacer sleeve to fasten the built-in domestic appliance to a wall with a fastening screw. The length-adjustable spacer has a first sleeve part mounted on the built-in domestic appliance and a second sleeve part that is telescopically adjustable relative to the first sleeve part and that is adjustable, in length, along an axis with respect to the first sleeve part until the second sleeve part is in contact with the wall. The built-in domestic appliance also includes a rotational securing assembly that limits rotational movement of the second sleeve part about the axis.

27 Claims, 3 Drawing Sheets

U.S. PATENT DOCUMENTS

Figure 1:
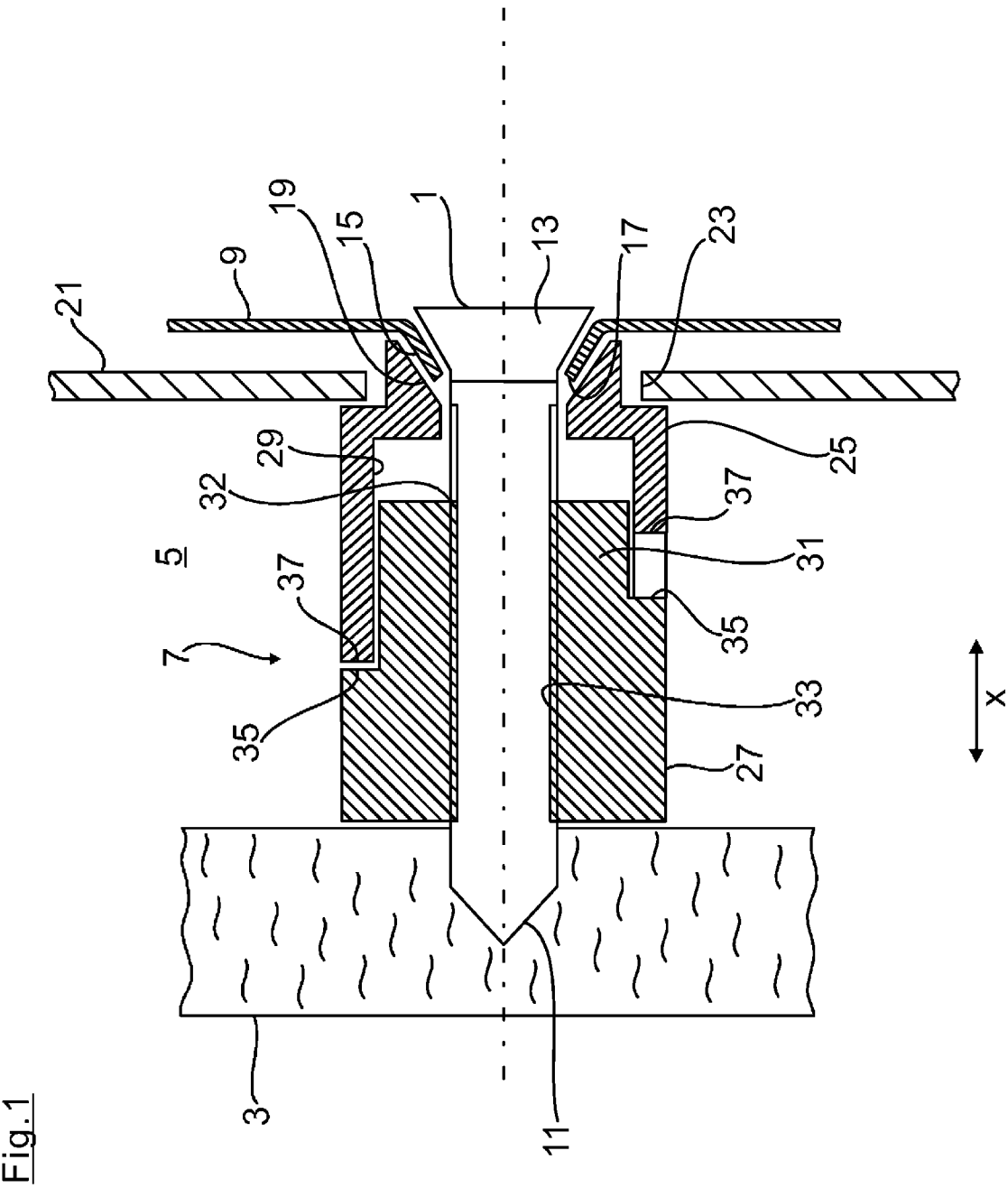

| | | | |
|---|---|---|---|
| 2004/0227043 A1* | 11/2004 | Deiss et al. | 248/231.9 |
| 2005/0025566 A1* | 2/2005 | Hasegawa | 403/408.1 |
| 2005/0053424 A1* | 3/2005 | Elmer | 403/390 |
| 2007/0173357 A1* | 7/2007 | Mauer et al. | 473/457 |
| 2007/0207012 A1* | 9/2007 | Lorenzo | 411/546 |
| 2008/0038090 A1* | 2/2008 | Figge et al. | 411/433 |
| 2008/0075556 A1* | 3/2008 | Smith | 411/379 |

* cited by examiner

BUILT-IN DOMESTIC APPLIANCE, IN PARTICULAR A DISHWASHER

BACKGROUND THE INVENTION

The invention relates to a built-in domestic appliance, particularly dishwasher, with at least one length-adjustable spacer sleeve for fastening the built-in domestic appliance to at least one wall, particularly a furniture wall, by means of a fastening screw, wherein the spacer sleeve comprises a first sleeve part mounted on the built-in domestic appliance and a second sleeve part, which is telescopically adjustable relative thereto and which is adjustable in length along an axis with respect to the first sleeve part until in contact with the wall, particularly furniture wall.

Built-in domestic appliances such as, for example, dishwashers are after insertion into, for example, installation niches of items of kitchen furniture screw-connected at the side to adjoining furniture walls by way of, for example, mounting plates or mounting angle brackets.

According to DE 75 34 416 U provision is made for screw-connection of the built-in domestic appliance in the region of each of its two side walls to a lateral furniture wall by means of a respective fastening screw. In order to overcome a free gap between the built-in domestic appliance and the adjoining furniture wall a spacer sleeve penetrated by the fastening screw is provided. The spacer sleeve has, as a first sleeve part, a bush with a threaded bore, the bush being fastened in fixed position in the built-in domestic appliance. A hollow-cylindrical screw bolt as a second sleeve part is screwed into the bush. Seated in the axial passage bore of the screw bolt is the fastening screw, which by the screw head thereof clamps a radially inwardly projecting annular collar of the screw bolt to the adjoining furniture wall.

In order to fasten the built-in domestic appliance to the lateral furniture wall initially the screw bolt is rotationally actuated by application of a screwdriver, whereby the screw bolt is moved in or out in the appliance lateral direction until the end face thereof is in contact with the furniture wall. In a second working step the fastening screw is then introduced into the passage bore of the screw bolt and screwed into the furniture wall.

BREIF SUMMARY OF THE INVENTION

An object of the invention consists in providing a built-in domestic appliance with an improved possibility for positional securing to at least one wall, particularly of an installation niche, preferably a niche of fitted furniture or an item of furniture, an associated length-adjustable spacer sleeve and a device or arrangement for fastening a built-in domestic appliance to at least one wall, particularly furniture wall, of an installation niche, in which the length adjustment of the spacer sleeve for overcoming a gap present between the built-in domestic appliance and the respective wall, particularly furniture wall, is simplified in terms of assembly.

According to the invention a rotational securing means which limits rotational movement of the second sleeve part with respect to the first sleeve part about the axis is provided. Assembly is thus substantially simplified, since through the application of a fastening screw a torque is transmitted to the second sleeve part, but this is limited by the rotational securing means and thus continuation of the assembly by continuing the screwing-in movement of the fastening screw until final fixing of the spacer sleeve can be maintained.

The second sleeve part can advantageously have an entrainer section for length adjustment of the spacer sleeve taking place with respect to the first sleeve part. The fastening screw can during insertion into the spacer sleeve hit against this entrainer section. In the further course of assembly the fastening screw can therefore be displaced by way of the entrainer section coupled in terms of movement with the second sleeve part until the second sleeve part is brought into contact with the respective wall of the installation niche, particularly the respective furniture wall of the fitted item of furniture. A length adjustment of the second sleeve part thus takes place automatically with the insertion of the fastening screw into the second sleeve part, whereby the assembly effort when fastening the built-in domestic appliance to at least one wall, particularly when installing the built-in domestic appliance in the respective installation niche, is reduced.

The two sleeve parts of the spacer sleeve can advantageously be telescopically adjustable relative to one another in order to bridge over the gap present between the built-in domestic appliance and the furniture wall. In this case the two sleeve parts can be arranged to be displaceable relative to one another in axial direction. For example, the length-adjustable sleeve part can be received within the first sleeve part, which is preferably mounted in stationary position on the built-in domestic appliance, to be telescopically displaceable. The entrainer section can in that case be formed at an end face of the second sleeve part. The fastening screw on insertion into the spacer sleeve can therefore impinge by its screw tip on the end face of the sleeve part and thus displace the second sleeve part relative to the furniture wall.

The entrainer section can alternatively be a section of reduced diameter in a passage bore of the second sleeve part. In this way the second sleeve part is initially pressed by the screw tip of the fastening screw against the furniture wall. The fastening screw can subsequently be screwed through the section of the passage bore of reduced diameter and, in particular, until in threaded engagement with the furniture wall. Alternatively thereto the entrainer section can completely close the passage bore of the second sleeve part in axial direction. In this case the entrainer section is to be designed so that it can be penetrated on application of the fastening screw.

The rotational securing means can preferably comprise respective mutually co-operating end faces at the first sleeve part and at the second sleeve part. The two mutually co-operating end faces of the sleeve parts are juxtaposed in axial direction and, in a development of the invention, extend at a predetermined pitch helically in circumferential direction around the two sleeve parts. In that case the end face of the second sleeve part can be formed at an annular shoulder which forms a transition between a smaller diameter outer section and a larger diameter outer section of the second sleeve part. The smaller diameter section of the second sleeve part can be arranged to be telescopically displaceable within the first sleeve part. The end face of the first sleeve part can, thereagainst, be formed at the first sleeve part to face the annular shoulder.

The mode of operation of these two helically extending, particular in the manner of a helix section, end faces is explained in the following: Thus, initially a length adjustment of the second sleeve part in the axial direction of the spacer sleeve takes place, whereby the two co-operating annular surfaces are moved away from one another. With subsequent rotational movement of the second sleeve part at least sections of the two helical end faces can be brought into contact with one another. In this case the two sleeve parts can be mutually supporting by virtue of the wedge effect between the two sleeve parts. It then has to be ensured that when the fastening screw is screwed in a torque applied to the second sleeve part is greater than an opposing friction moment which is produced as reaction moment between the second sleeve part and the furniture side wall.

In order to then avoid sliding-off of the end faces formed to be wedge-shaped relative to one another these are each advantageously constructed in the two sleeve parts to be stepshaped with radial surfaces lying in radial plane and axial surfaces lying in axial plane. In this manner, inclined sections, in which the risk of subsequent unintended rotational movement is present, in the annular surfaces are avoided.

The spacer sleeve can, in particular, be clamped between the screw head of the fastening screw and the furniture wall. For this purpose the screw head of the fastening screw can be supported on the side of the first sleeve part remote from the second sleeve part, for example in a countersinking formed therein. An opening edge region of a mounting opening of a service space container wall can then preferably be clamped between the first sleeve part of the spacer sleeve and the screw head of the fastening screw. In this case the fastening screw can, starting from the interior space of the service space container of the built-in domestic appliance, can thus be screwed outwardly into the respective fastening wall, in particular furniture wall.

A spacer sleeve and a fastening device for a built-in domestic appliance of that kind, particularly for a dishwasher, are also part of the invention.

The advantageous embodiments and developments of the invention as explained in the foregoing and/or reproduced in the subclaims in that case can—apart from, for example, the instances of unique dependencies or incompatible alternatives—be used individually or, however, also in any combination with one another.

BREIF DESCRIPTION OF THE DRAWINGS

Figure 2:
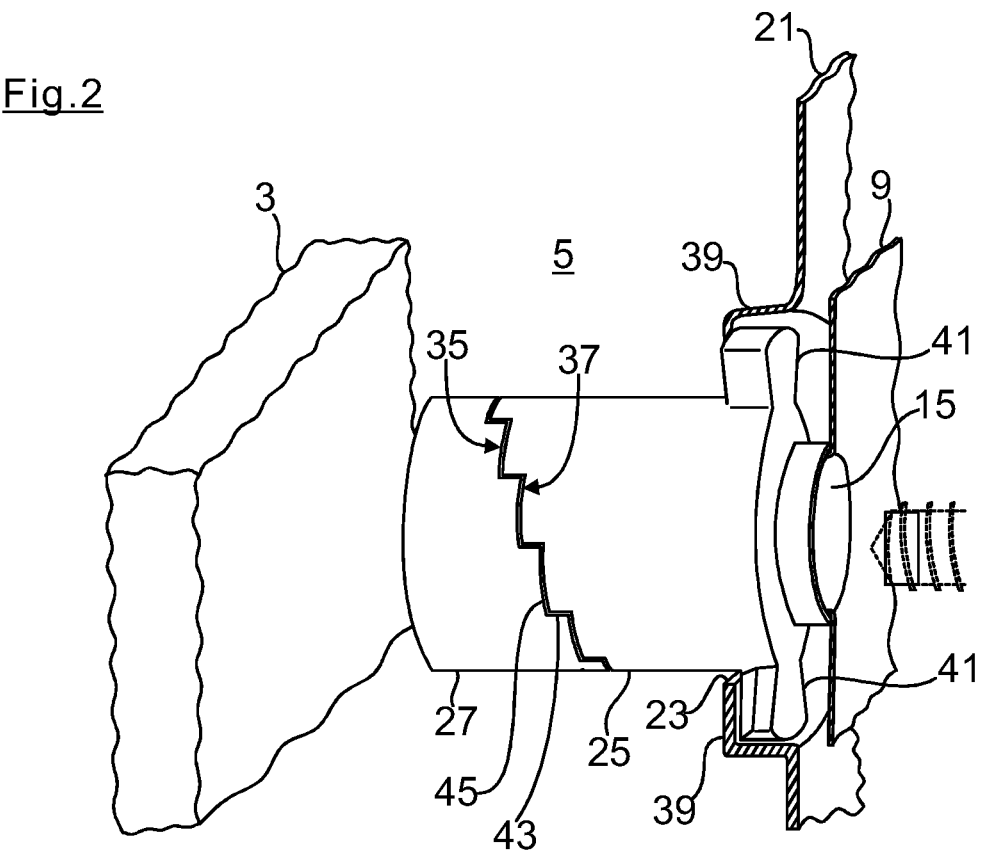
Figure 3:
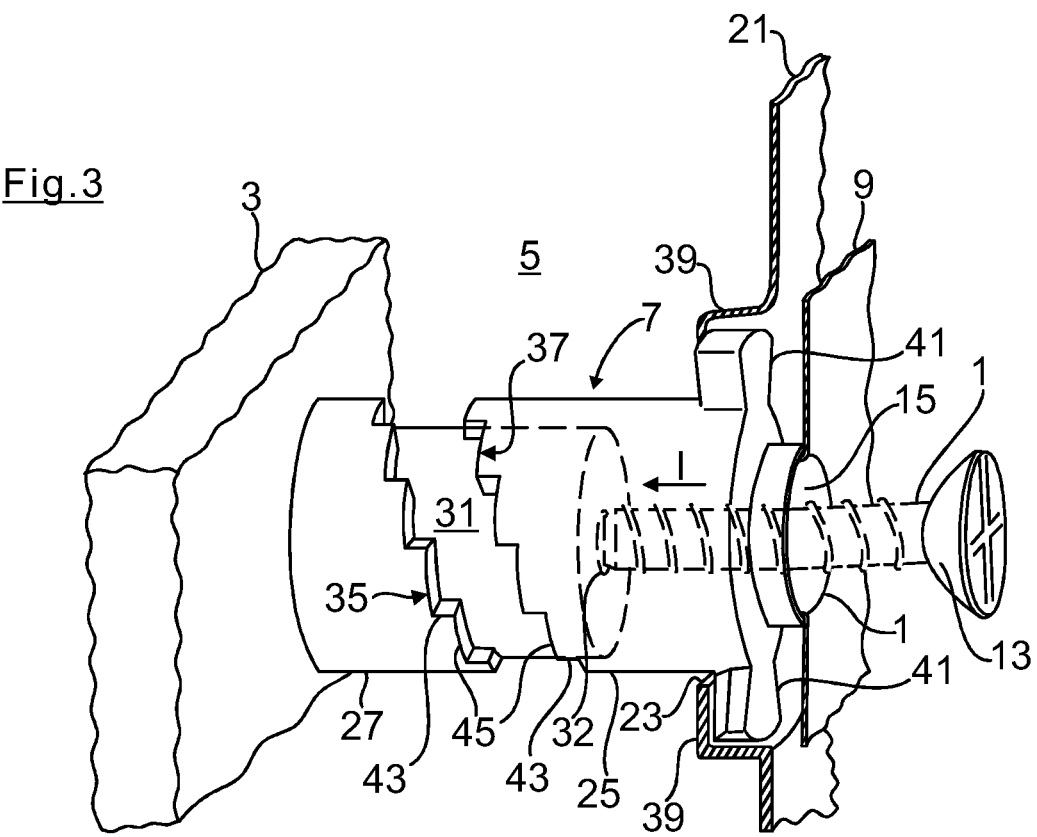
Figure 4:
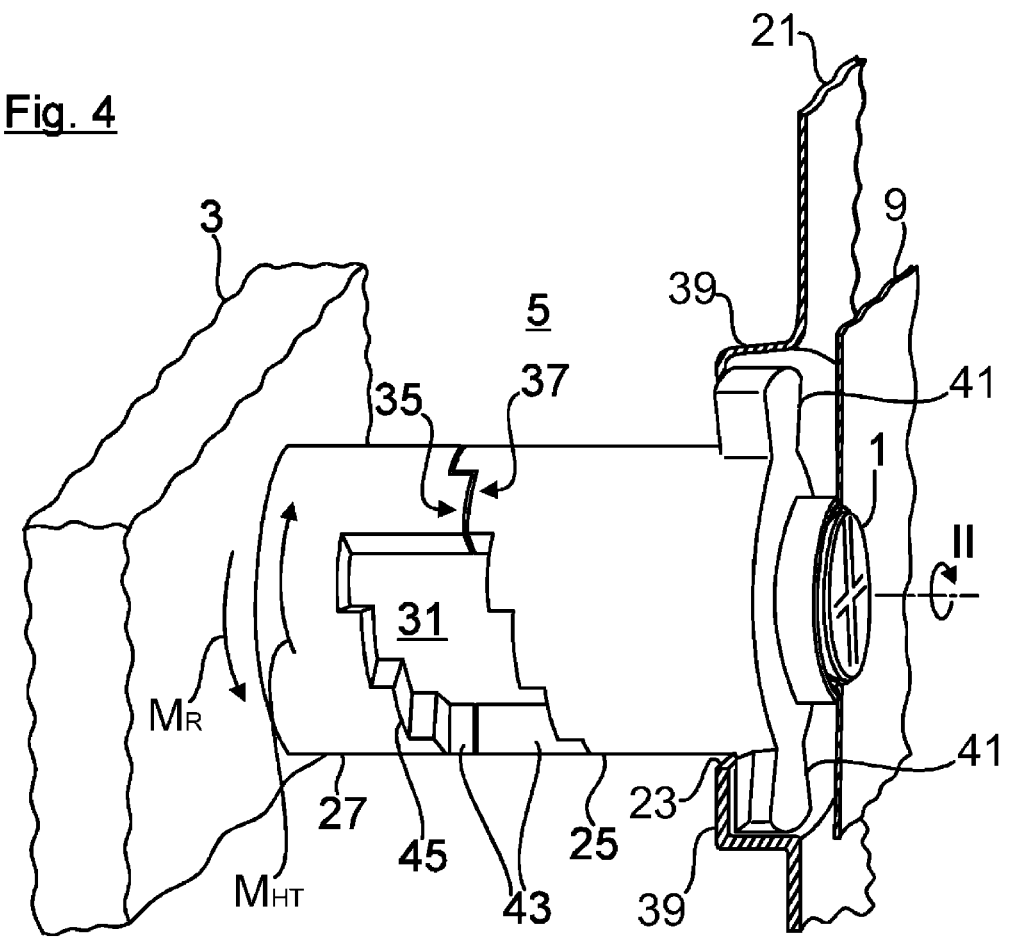

The invention and the advantageous embodiments and developments as well as advantages thereof are explained in more detail in the following by way of drawings, in which in each instance in a schematic basic diagram:

FIG. 1 shows, in an enlarged side sectional illustration, an exemplifying embodiment of a spacer sleeve, which is constructed in accordance with a construction principle according to the invention, in an installed position in which a built-in domestic appliance is fastened to the furniture wall of an installation niche; and FIGS. 2 to 4 respectively show different perspective views illustrating length adjustment of the spacer sleeve of FIG. 1 during mounting of the built-in domestic appliance in an installation niche.

DETAILED DESCRIPTION OF EXEMPLARY EMODIMENTS OF THE PRESENT INVENTION

Elements with the same function and manner of operation are respectively provided in FIGS. 1 to 4 with the same reference numerals.

An installation situation is shown to substantially enlarged scale in FIG. 1, in which a built-in domestic appliance such as, for example, a dishwasher is inserted into an installation niche. In the installation niche the sides of the built-in domestic appliance are screw-connected in an appliance lateral direction x by means of fastening screws 1 to respective laterally adjoining furniture side walls 3, of which in FIG. 1 merely one furniture side wall 3 is shown. Prior to the screw connection, the built-in domestic appliance is initially correctly located in position between the two furniture side walls 3, whereby respective lefthand and righthand gaps 5 which are bridged over by means of a spacer sleeve are created. By means of the two lateral spacer sleeves 7 the built-in domestic appliance can be held centred in the appliance lateral direction x between the two furniture side walls 3 of the installation niche.

The spacer sleeve shown in FIG. 1 is supported between the furniture side wall 3 and an outer side of the service space wall 9 of the built-in domestic appliance. In addition, the fastening screw 1, which is screwed by its screw tip 11 into the furniture side wall 3, is led through the spacer sleeve 7. The fastening screw 1 is additionally led through a mounting opening 17, which is formed in a dimple 15, of the service space wall 9. The screw head 13, which in the present exemplifying embodiment is formed as a countersunk head, of the fastening screw 1 is correspondingly supported in a corresponding countersinking 19 of the spacer sleeve 7 with interposition of the hole rim 15 of the service space wall 9. The fastening screw 1 can therefore be fitted or removed from the inner side of the service space container.

As is further evident from FIG. 1, arranged outside the service space wall 9 as a holding element 21 is an encircling support frame which is provided for stiffening of the service space container (not shown here). In the case of a dishwasher the encircling support frame 21 is arranged in the region of the front loading opening of the service space container. A passage opening 23 through which the spacer sleeve 7 is guided up to the outer side of the service space wall 9 is provided in the encircling frame 21.

According to the invention, the spacer sleeve 7, which in the present exemplifying embodiment is made of plastics material, is constructed to be adjustable in length, whereby adaptation to different gap widths between the built-in domestic appliance and the furniture side wall 3 is made possible. For this purpose the spacer sleeve 7 comprises two sleeve parts 25 and 27 telescopically displaceable relative to one another. The first sleeve part 25 is in that case supported by its end face, which is shown on the left in FIG. 1, directly on the service space wall 9. At its side remote from the service space wall 9 the first sleeve part 25 has a guide section 29 into which a guide cylinder 31 of the second sleeve part 27 projects. The inner diameter of the guide section 29 and the outer diameter of the guide cylinder 31 of the second sleeve part 27 are matched to one another in such a manner that an adjustment in length of the second sleeve part 27 in the direction of an axis I is made possible.

As further evident from FIG. 1, the second sleeve part 27 has a passage bore 33 which, by comparison with the screw diameter of the fastening screw 1, is reduced. When the fastening screw 1 is screwed in, the fastening screw 1 therefore automatically cuts an internal thread into the passage bore 33 of the second sleeve part 27. The second sleeve part 27 additionally has an encircling annular shoulder 35 which faces in the axial direction of an end face 37 of the first sleeve part 25. In FIG. 1 the annular shoulder 35 of the second sleeve part 27 and the end face 37 of the first sleeve part 25 are supported on one another above the screw axis, whereby movement of the guide cylinder 31 into the guide section 29 of the first sleeve part 25 is precluded.

The process for fastening the built-in domestic appliance to the furniture side wall 3 is explained on the basis of the following description FIGS. 2 to 4. In FIG. 2 the spacer sleeve 7 is shown with the second sleeve part 27 moved in an axial direction. The spacer sleeve 7 is prepositioned with its first sleeve part 25 at the encircling frame 21. In the illustrated preassembly state the fastening screw 1 is still not led through the spacer sleeve 7.

For the pre-positioning of the spacer sleeve the encircling frame 21 has in the region of its passage opening 23 offset detent straps 39 behind which laterally projecting wings 41 of the first sleeve part 25 can be engaged in the manner of a bayonet coupling. The spacer sleeve 7 can in this manner be centred with respect to the mounting opening 17 in the service space wall 9. According to FIG. 2 the spacer sleeve 7 is still spaced from the furniture side wall 3 by a free distance.

In FIG. 3 the fastening screw 1 is shown partly inserted into the spacer sleeve 7. In this insertion process the screw tip 11 impinges, in the direction of the axial axis I, on the end-face opening edge region 32 of the passage bore 33 of the second sleeve part 27. The opening edge region 32 with reduced diameter thus functions as an entrainer section by means of which the fastening screw 1 adjusts the second sleeve part 27 in a thrust movement in the direction of the axis I until in contact with the furniture side wall 3.

In addition, it is to be ensured that resetting of the second sleeve part 27 in the first sleeve part 25 is prevented after length adjustment of the spacer sleeve 7 has been carried out. For this purpose the annular shoulder 35 of the second sleeve part 27 and the facing end face 37 of the first sleeve part 25 extend helically in circumferential direction in co-operation with one another. Both the annular shoulder 35 and the end face 37 are formed to be step-shaped with radial surfaces lying in a radial plane and axial surfaces 45 lying in an axial plane. The respective axial surface 45 is, in a view on the outer circumferential surface of the respective housing part, in particular a step surface extending in circumferential direction. It is preferably that step surface on which the axial direction I or the axial central axis of the two sleeve parts 25, 27 of the spacer sleeve 7 forms a surface normal. It extends as a circularly annular section or as a section of a torus in the plane spanned by the radial direction and circumferential direction of the spacer sleeve 7. The respective radial surface 43 extends preferably transversely, particularly perpendicularly, to the respective adjacent, i.e. adjoining, axial surface 45. In a view on the outer circumferential surface of the respective sleeve part it preferably extends substantially parallel to the axial direction I. The respective radial surface 43 thus arises in each instance by a free section through the approximately circularly cylindrical circumferential surface of the respective housing part 25, 27 of the spacing sleeve 7 in radial direction and is thus substantially parallel thereto. To a first approximation it is preferably spanned by the axial direction I as well as by the radial direction or radial axis of the two sleeve parts 25, 27, which are of circularly cylindrical construction, of the spacer sleeve 7. At its circumferential location at the circumferential surface of the respective sleeve part a tangent thereto forms its surface normal. The radial surfaces 43 of at least one sleeve part such as, for example, 25 can optionally also be inclined relative to the axial direction. In particular, they can respectively have a positive gradient starting from the end of the sleeve part, such as, for example, 25 facing the other sleeve part, such as, for example, 27. An improved hooking of the two sleeve parts to one another on rotation of the two sleeve parts relative to one another in circumferential direction can thereby be achieved. In the case of frontal contact, i.e. pushing together of the two sleeve parts, a certain degree of clamping action of the two parts against one another can additionally be provided. This can be advantageous, for example, in the pre-assembly state, for example for transport of the two sleeve parts, so that they cannot unintentionally fall apart and become lost. The radial surfaces 43 and the axial surfaces 45 alternate in succession and thus form a step structure. It is obviously also possible to modify the radial and axial surfaces 43, 45 of the two sleeve parts 25, 27 so that these form, instead of surfaces perpendicular to one another, other surfaces transverse to one another, which nevertheless enable detenting of the two sleeve parts 25, 27 relative to one another in circumferential direction, i.e. stated generally produce a rotational securing when the two sleeve parts 25, 27 are turned relative to one another in circumferential direction. In the assembled state shown in FIG. 3 the radial and axial surfaces 43, 45 of the first and second sleeve parts 25, 27 are spaced from one other in the direction of the axis I.

In the further course of assembly the fastening screw 1, which according to FIG. 3 has already impinged on the opening edge region 32, is screwed through the passage bore 33 of the second sleeve part 27, wherein in accordance with the preceding description the fastening screw 1 cuts an internal thread into the passage bore 33 of the second sleeve part 27. In that case a rotational movement II of the second sleeve part 27 with respect to the first sleeve part 25 takes place automatically, as is shown in FIG. 4, about a central axis of the two sleeve parts. Through this rotational movement II the annular shoulder 35 of the second sleeve part 27 is brought by its radial and axial surfaces 43, 45 at least partly back into contact with corresponding radial and axial surfaces 43, 45 of the first sleeve part 25, as is shown in FIG. 4. In this manner a locking, by which movement of the second sleeve part 27 into the first sleeve part 25 is prevented, takes place by way of the rotational movement II of the second sleeve part 27. FIG 4. also illustrates that during telescopic adjustment of fastening screw 1 a torque $M_{HT}$ is applied to the second sleeve part 27. The torque is greater than an opposing friction movement $M_R$ between the second sleeve part 27 and wall 3, which may be by way of example, a furniture wall/furniture side wall.

The invention claimed is:

1. A built-in domestic appliance, comprising:
   a length-adjustable spacer sleeve to fasten the built-in domestic appliance to a first wall by a fastening screw, the length-adjustable spacer having a first sleeve part mounted on the built-in domestic appliance and a second sleeve part configured to adjust telescopically relative to the first sleeve part and to lengthen along an axis with respect to the first sleeve part until the second sleeve part is in contact with the first wall; and
   a rotational securing assembly that initially limits rotational movement of the second sleeve part about the axis on initial contact of the second sleeve part with the fastening screw, then permits rotational movement of the second sleeve part about the axis after telescopic adjustments of the spacer sleeve, and then again limits rotational movement of the second sleeve part about the axis after the first and second sleeve parts reengage in a lengthened position.

2. The built-in domestic appliance of claim 1, wherein the first wall is a furniture wall.

3. The built-in domestic appliance of claim 1, wherein the rotational securing assembly has, at the first sleeve part and at the second sleeve part, mutually co-operating end faces that face one another in axial direction.

4. The built-in domestic appliance of claim 3, wherein each of the end faces extends helically in circumferential direction.

5. The built-in domestic appliance of claim 4, wherein each of the end faces extends in the manner of a helix section in the circumferential direction.

6. The built-in domestic appliance of claim 3, wherein the end faces of the first sleeve part and the second sleeve part are configured to be out of contact after telescopic adjustments and to be brought back into contact by subsequent rotational movement of the second sleeve part.

7. The built-in domestic appliance of claim 3, wherein the end faces of the first sleeve part and the second sleeve part are stepped with radial surfaces lying in a radial plane and axial surfaces lying in an axial plane.

8. The built-in domestic appliance of claim 1, wherein the second sleeve part has an entrainer section, and the fastening screw and entrainer section are configured to complete the rotational movement of the second sleeve part by screwing the fastening screw into the entrainer section.

9. The built-in domestic appliance of claim 1, wherein the the second sleeve part is configured to apply a torque during screwing in of the fastening screw is greater than an opposing friction created between the second sleeve part and the first wall.

10. The built-in domestic appliance of claim 9, wherein the first wall is a furniture wall.

11. The built-in domestic appliance of claim 10, wherein the furniture wall is a furniture side wall.

12. The built-in domestic appliance of claim 1, wherein the fastening screw includes a screw head is supported on a side of the first sleeve part that faces away from the second sleeve part.

13. The built-in domestic appliance of claim 12, wherein the screw head is supported in a countersinking.

14. The built-in domestic appliance of claim 1, further comprising a service space container having a second wall, the second wall having a mounting opening with an opening edge region, wherein the opening edge region is clamped between the first sleeve part and the screw head.

15. The built-in domestic appliance of claim 14, wherein the second wall is a side wall.

16. The built-in domestic appliance of claim 15, wherein the built-in domestic appliance has, at an outer side of the second wall, a mounting element in which the length-adjustable spacer sleeve is pre-positioned relative to the mounting opening.

17. The built-in domestic appliance of claim 16, wherein the mounting element is a frame.

18. The built-in domestic appliance of claim 14, wherein the fastening screw to be screwed into the length-adjustable spacer sleeve has a screw head and a screw thread; and wherein, at a transition to the screw thread, the screw head is formed with an annular surface that is liquid-tight relative to the opening edge region of the mounting opening of the second wall of the service space container.

19. The built-in domestic appliance of claim 18, wherein the second wall is a side wall of the service space container.

20. The built-in domestic appliance of claim 1, wherein the built-in domestic appliance includes a frame, wherein the first sleeve part is formed at the frame.

21. The built-in domestic appliance of claim 20, wherein the first sleeve part is at least one of material-unitarily and integrally formed at the frame.

22. A length-adjustable spacer sleeve for fastening a built-in domestic appliance to a wall, the length-adjustable spacer sleeve comprising:
a first sleeve part mounted to project from an exterior of the built-in domestic appliance; and
a second sleeve part configured to be telescopically adjustable from an interior service wall space of the built-in domestic appliance, relative to the first sleeve part along an axis; and
a rotational securing assembly configured to initially limit rotational movement of the second sleeve part about the axis on initial contact of the second sleeve part with a fastening screw, then to allow rotational movement of the second sleeve part about the axis after telescopic adjustment of the spacer sleeve, and then to once again limit rotational movement of the second sleeve part about the axis after the first and second sleeve parts reengage in a lengthened position.

23. The length-adjustable space sleeve of claim 22, wherein the wall is an installation niche.

24. The length-adjustable space sleeve of claim 23, wherein the installation niche is a niche of one of a fitted furniture and a piece of furniture.

25. An arrangement to fasten a built-in domestic appliance to a wall, the arrangement comprising:
a length-adjustable spacer sleeve having a first sleeve part mounted on an exterior of the built-in domestic appliance and a second part; wherein
the second sleeve part comprises an encircling annular shoulder and the first sleeve part comprises an end face, where the encircling annular shoulder and the end face each include opposing steps facing one another and configured to telescopically adjust the length-adjustable spacer sleeve along an axis with axial movement of the second sleeve part from a thrust movement with a fastening screw in contact with the second sleeve part, followed by rotational movement of the second sleeve part via the fastening screw about the axis after telescopic adjustment of the spacer sleeve, and with the first and second sleeve parts reengaging in a lengthened position with the opposing steps coming together.

26. The arrangement of claim 25, wherein the wall is an installation niche.

27. The arrangement of claim 26, wherein the installation niche is a niche of one of a fitted furniture and a piece of furniture.

* * * * *